United States Patent
Del Sordo et al.

(10) Patent No.: US 8,141,123 B2
(45) Date of Patent: Mar. 20, 2012

(54) METHOD AND APPARATUS FOR RECORDING AND RENDERING PROGRAMS THAT CROSS SDV FORCE TUNE BOUNDARIES

(75) Inventors: Chris Del Sordo, Souderton, PA (US);
Ernie Schmitt, Maple Glen, PA (US);
Ed Walls, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 1125 days.

(21) Appl. No.: 11/959,566

(22) Filed: Dec. 19, 2007

(65) Prior Publication Data
US 2009/0162033 A1    Jun. 25, 2009

(51) Int. Cl.
*H04N 7/173* (2006.01)
*H04N 7/16* (2006.01)

(52) U.S. Cl. .......................... 725/142; 725/134; 386/124

(58) Field of Classification Search ............ 725/86–119, 725/131–134, 139–142, 151–153; 386/1, 386/46, 83, 124
See application file for complete search history.

(56) References Cited

U.S. PATENT DOCUMENTS

| | | | |
|---|---|---|---|
| 6,480,667 B1* | 11/2002 | O'Connor | 386/326 |
| 6,621,528 B1* | 9/2003 | Kessler et al. | 348/734 |
| 6,728,965 B1* | 4/2004 | Mao | 725/38 |
| 6,985,188 B1* | 1/2006 | Hurst, Jr. | 348/553 |
| 7,024,676 B1* | 4/2006 | Klopfenstein | 725/49 |
| 7,200,321 B2 | 4/2007 | Otala et al. | |
| 7,440,674 B2* | 10/2008 | Plotnick et al. | 386/343 |
| 7,848,618 B2* | 12/2010 | Potrebic et al. | 386/344 |
| 7,925,141 B2* | 4/2011 | Geer et al. | 386/341 |
| 2004/0128701 A1* | 7/2004 | Kaneko et al. | 725/136 |
| 2006/0039676 A1* | 2/2006 | Van Der Heijden et al. | 386/68 |
| 2007/0297460 A1* | 12/2007 | Muneishi et al. | 370/516 |

\* cited by examiner

*Primary Examiner* — Annan Shang

(57) ABSTRACT

A method is provided for recording a switched digital video (SDV) program received over a content delivery system. The method includes receiving a single program digital transport stream on a first SDV channel. The single program digital transport stream includes at least one program elementary stream and associated program specific information. The program elementary stream and the associated program specific information are stored. In response to a force tune request, a second SDV channel is tuned to on which a subsequent portion of the single program digital transport stream will be provided. After tuning to the second SDV channel, subsequent portions of the program elementary stream are stored in a content file in which previous portions of the program elementary stream are stored.

20 Claims, 4 Drawing Sheets

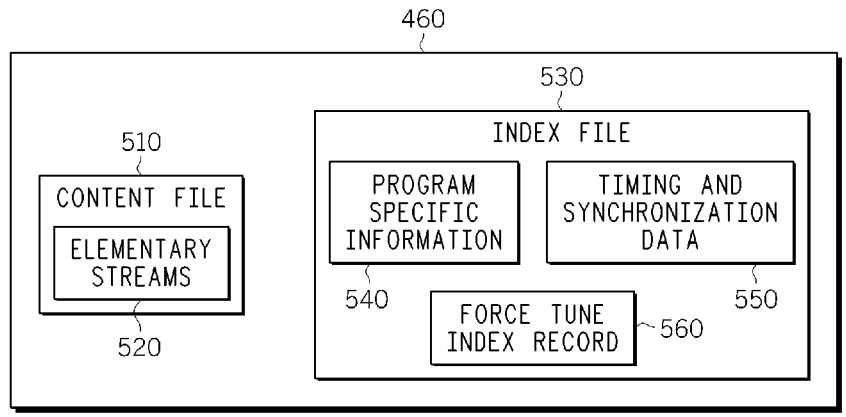
FIG. 5
FIG. 6
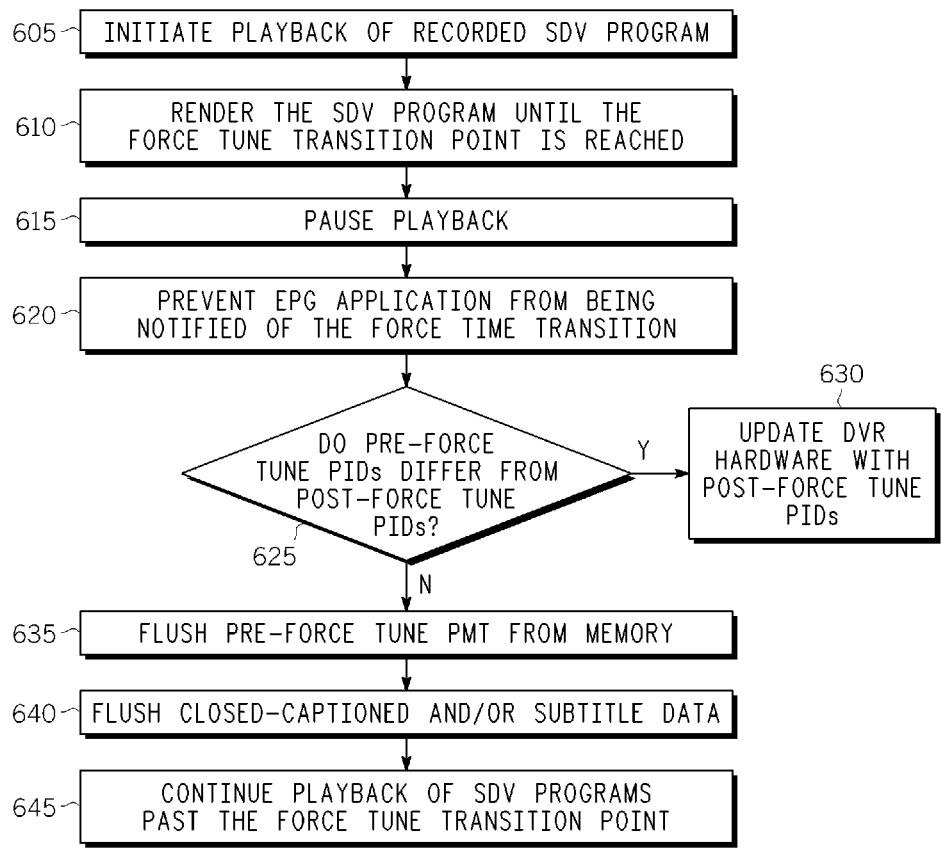

METHOD AND APPARATUS FOR RECORDING AND RENDERING PROGRAMS THAT CROSS SDV FORCE TUNE BOUNDARIES

FIELD OF THE INVENTION

The present invention relates generally to a switched digital video system for distributing content to a subscriber over a system such as a satellite or cable television system, and more particularly to a switched digital video system in which a subscriber can record and render SDV programs in a simple and convenient manner.

BACKGROUND OF THE INVENTION

Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, a switched digital video channel is only available when requested by one or more authorized subscribers. Also, unlike video on-demand, which switches a singlecast interactive program to a user, switched digital video switches broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

As noted, switched digital video is largely a tool to save bandwidth. From the subscriber perspective, he or she still receives the same broadcast video service when using a switched broadcast technique; ideally the user is not able to discern that the stream was switched at all. If each one of the digital broadcast channels is being watched by subscribers in the same service group, the switched digital video approach does not yield any bandwidth savings. However, a more likely situation statistically is that only a certain number of the digital broadcast channels are being watched by subscribers in the same service group at any given time. Those channels not requested by a subscriber need not be broadcast, thereby saving bandwidth.

One way to support switched digital video is to utilize a session manager to manage SDV sessions and provision services. The subscriber's receiver (e.g., a set top terminal) will request an SDV program from the session manager. The session manager will determine if the requested channel is already being sent to the corresponding service group that the subscriber belongs to. The subscriber receiver will be assigned to join the existing SDV service if the requested channel is available at the service group or assigned to a new SDV service if the requested channel is not available at the service group. The Session Manager will negotiate with the edge devices to allocate resources required for the service. The edge device (e.g., a digital modulator such as a QAM modulator) needs to dynamically retrieve the MPEG single program transport stream that carries the requested broadcast program (likely via IP unicast or multicast) and generate the MPEG multiple program transport stream. As part of the service setup response message, the video tuning parameters such as frequency and MPEG program number are sent back to the subscriber to access the requested broadcast channel.

When a subscriber is viewing an SDV program it occasionally may be necessary to transfer the program from one edge device to another in order, for example, to balance out the number of programs being supplied by the edge devices. When performing such a transfer, the SDV manager sends a message requesting the set top terminal to tune to a channel corresponding to the program's new frequency and program number using a so-called force tune function or process.

Subscriber receivers such as set top terminals are increasingly incorporating digital video recorder (DVR) functionality to record programming that is received over the content delivery system. DVRs can be used to record SDV and non-SDV (e.g., broadcast) programming. In many cases the subscriber can conveniently record a desired program using an electronic program guide (EPG), which is an interactive, on-screen display feature that displays information analogous to TV listings found in local newspapers or other print media. An EPG provides information about each program being broadcast within the time period covered by the EPG, which typically ranges from the next hour up to several days. The information contained in an EPG includes programming characteristics such as, for example, channel number, program title, start time, end time, elapsed time, time remaining, and a brief description of the program's content. Using the DVR system, the EPG allows the viewer to automatically record a program based on the information in the EPG.

If a force tune process is initiated while a subscriber is recording an SDV program using the DVR functionality available on the set top terminal, the recording process will generally terminate. Thus, the subscriber will only record the portion of the program that was received before the force tune occurred. In order to record the remaining portion of the program, the subscriber would need to manually re-start the recording process using the new tuning information available through the EPG. Not only is this disruptive and inconvenient for the subscriber, it also results in the creation of two separate recording files—one for the part of the program that was recorded before the force tune and one for the part of the program that was recorded after the force tune. The subscriber would thus need to play back two files in order to view the entire SDV program, which is a further inconvenience for the subscriber.

Accordingly, it would be desirable to provide a method and apparatus that allows an SDV program to be recorded in a manner that is least disruptive to the subscriber when a force tune occurs. That is, the recording process should require no subscriber intervention during both recording and playback and should minimize any discernable disruption within the recorded program itself

SUMMARY OF THE INVENTION

In accordance with one aspect of the present invention, a method is provided for recording a switched digital video (SDV) program received over a content delivery system. The method includes receiving a single program digital transport stream on a first SDV channel. The single program digital transport stream includes at least one program elementary stream and associated program specific information. The program elementary stream and the associated program specific information are stored. In response to a force tune request, a second SDV channel is tuned to on which a subsequent portion of the single program digital transport stream will be provided. After tuning to the second SDV channel, subsequent portions of the program elementary stream are stored in a content file in which previous portions of the program elementary stream are stored.

In accordance with another aspect of the invention, the single program digital transport stream is an MPEG transport stream and the associated program specific information includes at least one packet identifier (PID) identifying the at least one program elementary stream.

In accordance with another aspect of the invention, the associated program specific information further includes a PCR PID, an ECM PID and a service number.

In accordance with another aspect of the invention, timing information is generated as the single program digital transport stream is being received and stored. In response to the force tune request, a timing offset is defined to denote a point in time at which the force tune occurred. After tuning to the second SDV channel, timing information is stored for the subsequent portions of the program elementary stream by adding the timing offset to the generated timing information.

In accordance with another aspect of the invention, after receipt of the force tune request, a record is maintained of the program specific information associated with a portion of the program elementary stream that was stored prior to receipt of the force tune request.

In accordance with another aspect of the invention, a set top terminal is provided. The set top terminal includes a receiver/tuner for receiving SDV programs over a content delivery system and an SDV module for coordinating SDV sessions in cooperation with an SDV manager associated with the content delivery system. A DVR module is provided for coordinating storage and playback of SDV programs received over the content delivery system. The DVR module is configured to store in a common control file and common index file a program elementary stream and associated program specific information, respectively, extracted from both a first portion of an SDV program received on a first SDV channel and a second portion of the SDV program received on a second SDV channel in response to a force tune request received by the SDV module. A processor is operationally associated with the receiver/tuner, the SDV module and the DVR module.

BRIEF DESCRIPTION OF THE DRAWINGS

FIG. 5 shows one example of an index file that is generated when a DVR records a program.

FIG. 6 is a flowchart illustrating one example of the playback of an SDV program process through a force tune transition point.

DETAILED DESCRIPTION

Figure 1:
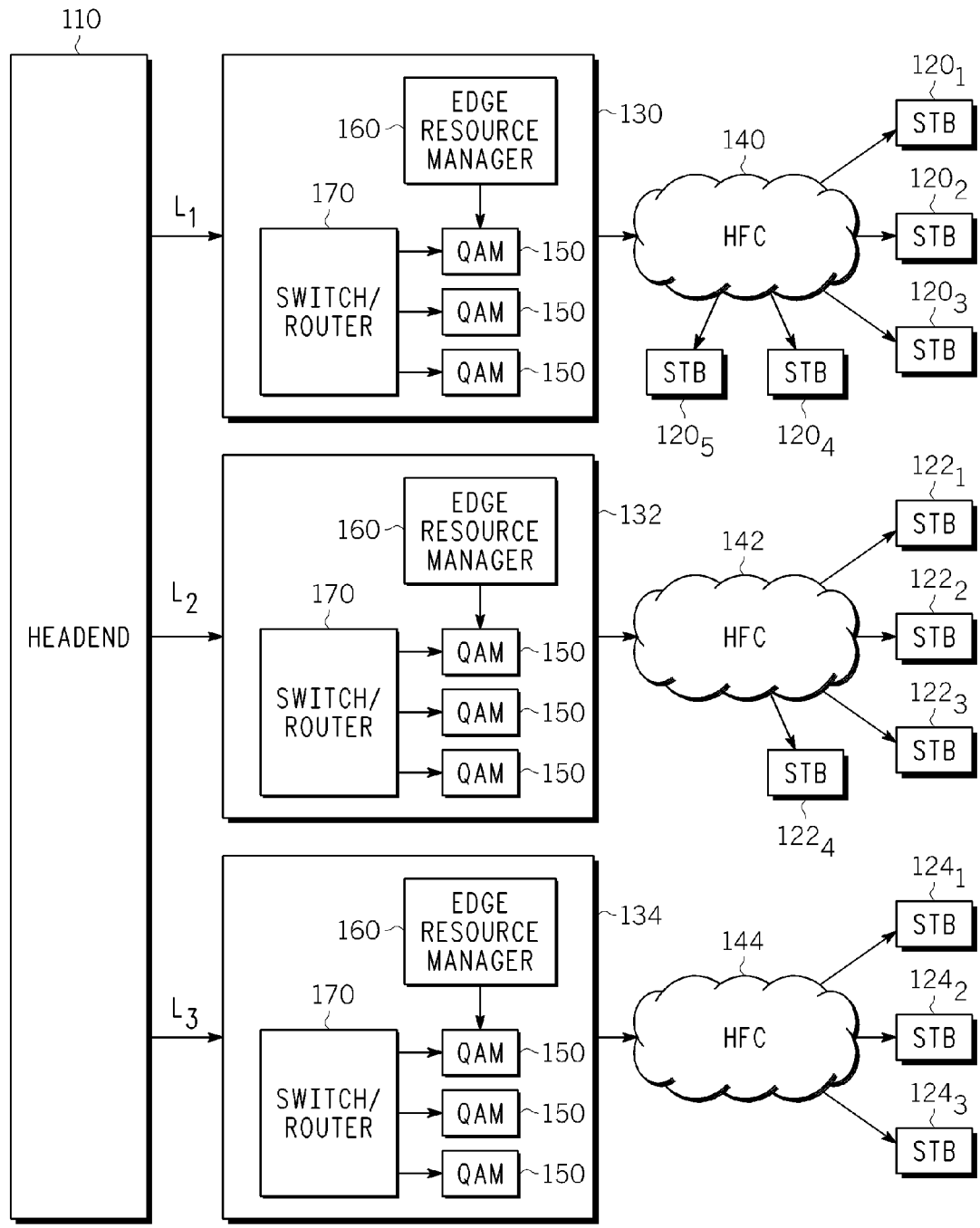
FIG. 1 shows a content delivery system architecture for delivering switched digital channels to a subscriber during a switched digital video (SDV) session.

FIG. 1 is a content delivery system architecture 100 for delivering switched digital channels to a subscriber during a switched digital video (SDV) session. The SDV session is implemented through a service offering in which application level data generated by a set top terminal initiates a SDV session request and an SDV manager routes data in accordance with the request to provision the service. Among other components, system architecture 100 comprises a content source such as a headend 110 that is connected to multiple intermediate entities such as hubs 130, 132 and 134. The headend 110 communicates with a switch or router 170 in hubs 130, 132 and 134 over links L1, L2 and L3, respectively. The headend 110 and hubs 130, 132, and 134 may communicate over a packet-switched network such as a cable data network, passive optical network (PON) or the like using, for example, IP multicast addressing.

Some or even all of the hubs are connected to multiple users, typically via distribution networks such as local cable access networks (e.g., HFC networks). For simplicity of explanation only, each hub is shown as being connected to a distinct HFC network, which in turn communicate with end user equipment as illustrated. In particular hubs 130, 132 and 134 in FIG. 1 communicate with access networks 140, 142 and 144, respectively. Each access network 140, 142 and 144 in turn communicates with multiple end user devices such as set top or subscriber terminals. In the example of FIG. 1, access network 140 communicates with set top terminals $120_1$, $120_2$, $120_3$, $120_4$ and $120_5$, access network 142 communicates with set top terminals $122_1$, $122_2$, $122_3$ and $122_4$, and access network 144 communicates with set top terminals $124_1$, $124_2$ and $124_3$.

In addition to the switch or router 170, each hub can include an array of radio frequency transmitter edge devices such as edge QAM modulators 150. The number of edge devices 150 in each hub may vary as needs dictate. As used herein, the term "QAM" refers to modulation schemes used for sending signals over cable access networks. Such modulation schemes might use any constellation level (e.g. QAM-16, QAM-64, QAM-256 etc.) depending on the details of a cable access network. A QAM may also refer to a physical channel modulated according to such schemes. Typically, a single QAM modulator can output a multiplex of ten or twelve programs, although the actual number will be dictated by a number of factors, including the communication standard that is employed. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users, over the HFC network. Each transport stream is mapped to a downstream QAM channel. Each QAM channel has a carrier frequency that differs from the carrier frequency of the other channels. The transport streams are mapped according to a channel plan designed by the MSO that operates the network.

Each hub 130, 132 and 134 also includes an edge resource manager 160 for allocating and managing the resources of the edge devices 150. The edge resource manager 160 communicates with and receives instructions from the session manager located in the headend 110. In some case the edge resource manager and/or session manager can be located in the headend.

Figure 2:
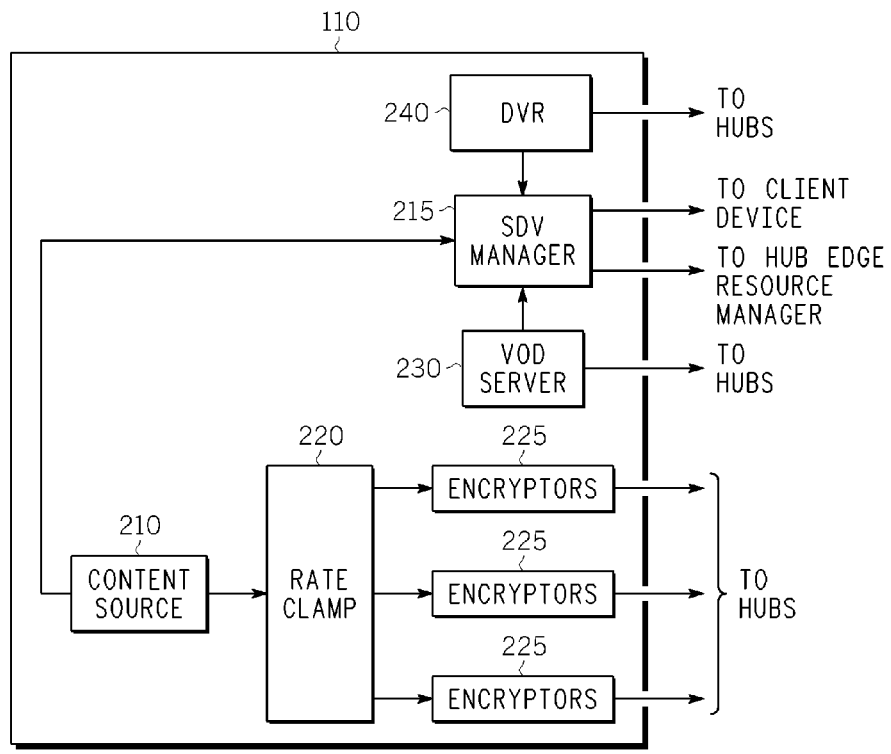
FIG. 2 shows one example of a headend.

FIG. 2 shows one example of headend 110. The headend 110 includes a broadcast content source 210, which may include, by way of example, satellite receivers, off-air receivers and/or content storage devices such as servers. A SDV manager 215 is used to determine which SDV transport streams are being transmitted at any time and for directing the set top terminals to the appropriate stream. The SDV manager 215 also keeps track of which subscribers are watching which channels and it communicates with the edge resource managers 160 in the hubs so that the content can be switched on and off under the control of the SDV manager 215. In addition, all subscriber requests for a switched digital channel go through the SDV manager 215. The switched digital channels are forwarded to a rate clamp 220 and one or more encryptors 225 using, for example, IP multicast addressing. The content is then encrypted by the encryptors 225 and transmitted to the appropriate hub or hubs. Typically, standard definition (SD) channels are currently rate clamped to 3.75 Mbps while high definition channels are currently rate clamped to between about 12 Mbps and 15 Mbps. The encryptors 225 encrypt the digitally encoded content, often under the control of a conditional access system (not shown).

Headend 110 may also include a network DVR 240. The network DVR 240 stores content that can be transmitted to set top terminal via a hub and access network in response to a user request to play a program stored on the DVR 240. Other user input requests are also serviced by network DVR 240, including, for example, requests to accelerate the playing of a program in the forward direction (e.g., cueing) and in the reverse direction (e.g., reviewing). The content is stored by the network DVR 240 upon a user request. The content may be provided to the network DVR 240 from any available content source, including, for example, content source 210.

It should be noted that in some cases some or all of the functionality of the SDV manager 215 may be transferred to each of the hubs 130, 132 and 134. For example, as described below, force tune requests may be generated and communicated to the set top terminals by the hubs.

Headend 110 may also include a variety of other components for offering additional services. For example, in FIG. 2 a video on demand (VOD) server 230 is shown for storing programs or other content for distribution to subscribers on an on-demand basis. Although not shown, one of ordinary skill in the art would recognize that other components and arrangements for achieving the various functionalities of headend 110 are possible. For example, the headend 110 may comprise typical headend components and services including a billing module, an advertising insertion module, a subscriber management system (SMS), a conditional access system and a LAN(s) for placing the various components in data communication with one another. It will also be appreciated that the headend configuration depicted in FIG. 2 is a high-level, conceptual architecture and that each network may have multiple headends deployed using different architectures.

The edge devices 150 provide programming to the set top terminals using the downstream in-band channels. To communicate control information and the like with the headend 110 and/or the relevant hub, the set top terminals may use out-of-band (OOB) or DOCSIS channels or an IP tunnel or an IP connection and associated protocols. However, in some cases communication of control information and the like can be performed using in-band channels as well.

Control information that may be communicated over the out-of-band channels includes the aforementioned force tune requests that are provided by the SDV manager 215 to force set top terminals that are receiving an SDV program on one SDV channel to tune to another SDV channel on which the subsequent portion of the SDV program will be made available.

Figure 3:
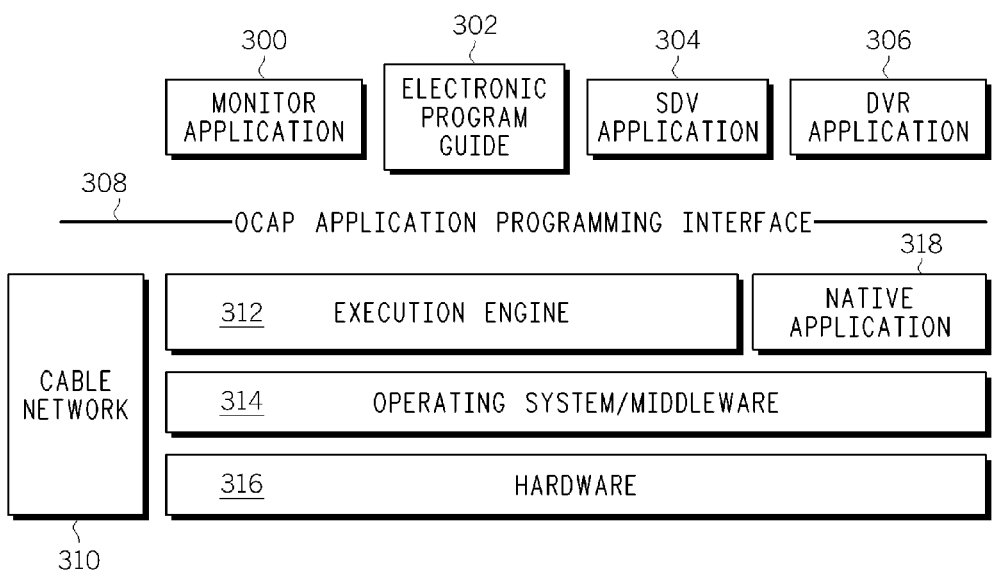
FIG. 3 shows the logical architecture of one particular example of a set top terminal.

FIG. 3 shows the logical architecture of one particular example of a set top terminal. In this example the set top terminal is compliant with the OpenCable Application Platform (OCAP) hardware and software environment. The OCAP specification is a middleware software layer specification intended to enable the developers of interactive television services and applications to design such products so that they will run successfully on any cable television system, independent of set top or television receiver hardware or operating system software choices. As is well known, middleware generally comprises one or more layers of software which are positioned "between" application programs and the lower or physical layers of the network device. Middleware is commonly written for the specific requirements of the operator of the computer system, and the proprietary software purchased by the operator of the computer system. A key role of middleware is to insulate the application programs from the device specific details. By using middleware the application programmers need know very little about the actual network details, since they can rely on the middleware to address the complexities of interfacing with the network. Of course, the set top terminal is not limited to an OCAP-compliant software/hardware architecture. In other cases, for example, the set top terminal may be compliant with MHEG, DASE or Multimedia Home Platform (MHP) middleware. Alternatively, the set top terminal may be based on a proprietary architecture.

Referring to FIG. 3, the top of an OCAP software "stack" includes a Monitor Application Module 300, Electronic Program Guide (EPG) Module 302, SDV application Module 304 and DVR application Module 306. These applications are run on top of a software layer called the "Execution Engine" 312 and interface to the Execution Engine using the well known OCAP APIs 308. The client device may also include certain software applications or "Native Applications" 318 that do not run within the Execution Engine, but directly run on top of the Operating System/Middleware 314 for the client device. Native Applications are typically written for, e.g., a particular hardware configuration 316 of the set top terminal. Examples of such Native Applications may include management of front panel functionality, remote control interaction, games, and the like. It should be noted that while Monitor Application Module 300, Electronic Program Guide (EPG) Module 302, SDV application Module 304 and DVR application Module 306 are depicted as residing on top of the execution engine 312, in some cases one or more of these applications may be integrated with the execution engine 312 or any other module residing below the OCAP APIs 308. Accordingly, processes that are described herein as being performed by the DVR or EPG applications may alternatively be performed by the execution engine 312 or any other appropriate module or component.

Figure 4:
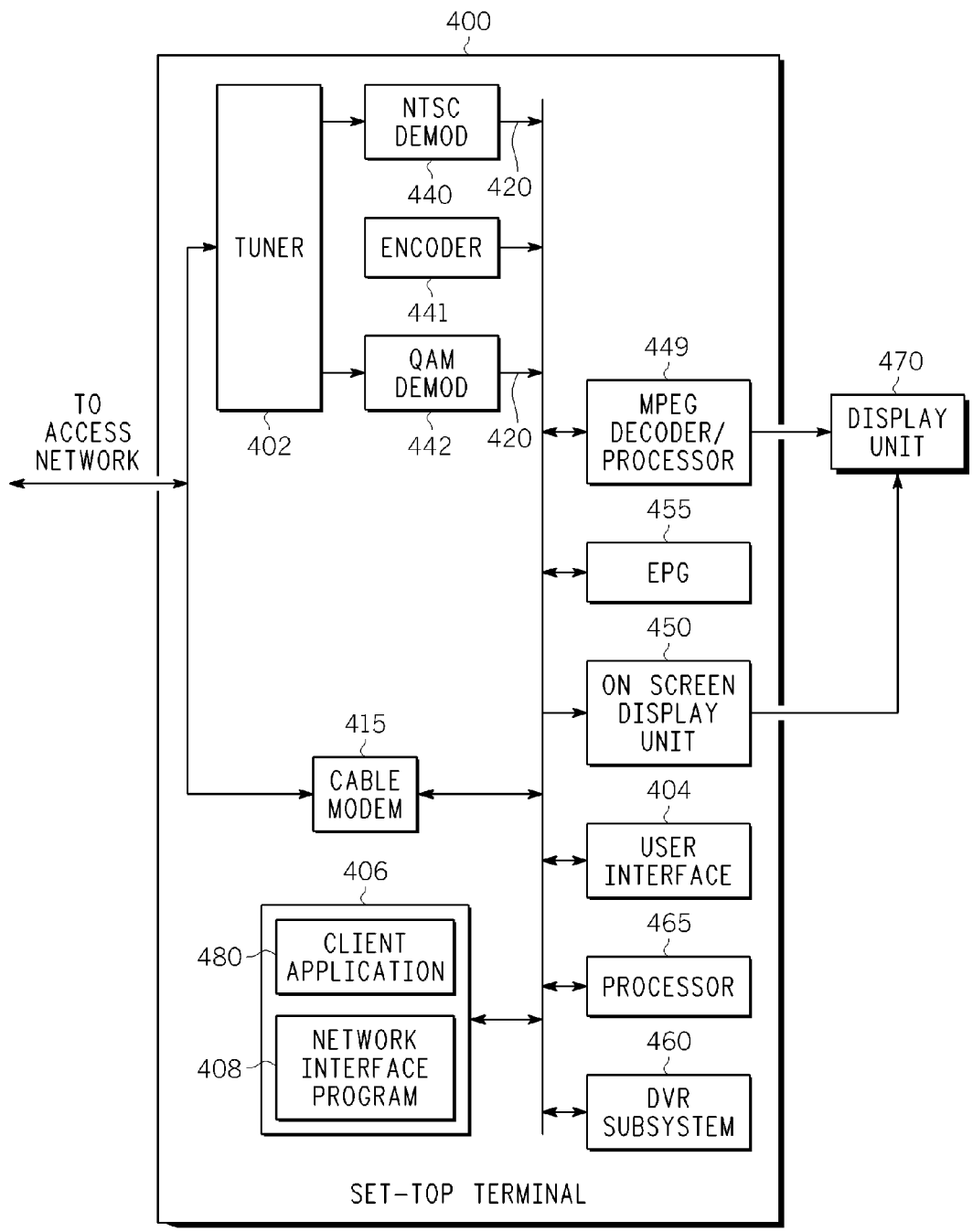
FIG. 4 shows one example of the hardware that may be employed by a set top terminal.

One example of a set top terminal 400 is shown in more detail in FIG. 4 It should be noted that set top terminal 400 more generally may be any apparatus such as a hardware card, specially programmed computer or other device having the functionality described herein that may be placed near to or within a television or other display device (such as a computer monitor) such as display unit 470. The set top terminal 400 receives content from cable access networks seen in FIG. 1. Broadly speaking, a traditional set top terminal such as that depicted in FIG. 4 is a device that can receive, store and forward content without manipulating the content in any significant way except to format it so that it may be rendered in a suitable manner.

Set top terminal 400 includes an in-band tuner 402, which tunes to a channel signal selected by a consumer (not shown) via user interface 404. User interface 404 may be any control device such as a remote control, mouse, microphone, keyboard, or display. NTSC demodulator 440 and digital demodulator 442 are responsive to in-band tuner 402. NTSC demodulator 440 includes components responsive to receive analog versions of a channel signal. A digital demodulator 442, which as shown is a QAM demodulator, but, which may be any type of digital demodulator device, includes components responsive to receive digital versions of a channel signal, and to output video information. QAM demodulator 442 receives and processes digital data packets from one or more digital sources, such as a digital television signal, an MPEG transport stream, or a media stream from an external network connection, such as cable modem 415 (if available), using well-known methods and techniques.

Demodulators 440 and 442 are operative to output video information 420. Video information 420 includes raw video and/or audio data, arranged for formatting in accordance with a predetermined media format. Video information 420 is preferably arranged in accordance with an MPEG media format, such as the MPEG-2 media format, but may be arranged in accordance with other media formats, including but not limited to other MPEG formats, Hypertext Markup Language (HTML), Virtual Hypertext Markup Language (VHTML), X markup language (XML), H.261, or H.263 formats. The video information 420 generally composes a single program transport stream. The single program transport stream includes the various program elementary streams such as video, audio and data elementary streams. The single program transport stream also includes program specific information associated with the elementary streams such as system tables, which in the case of MPEG, for example, includes the Program Map Table (PMT). The PMT describes the elementary streams (e.g., video, audio and data streams) that compose the program being recorded. The PMT specifies the packet identifiers (PIDs) for each elementary stream. For instance, a video program will generally include a video and audio PID as well as certain other PIDs such as a Program Clock reference (PCR) PID and an Entitlement Control Message (ECM) PID.

Video information that may require format translation or modification for compatibility with capabilities of set top terminal 400 may be passed to encoder 441 for formatting. Video information that is in a format preferred for use by MPEG Decoder/Multi Media Processor 449 may be passed directly to MPEG Decoder/Multi Media Processor 449. Encoder 441 is operative to perform predetermined coding techniques (for example, MPEG-2, MPEG-4, and others) to produce an encoded video signal for transmission to MPEG Decoder/Multi Media Processor 449, or for storage. MPEG Decoder/Multi-Media Processor 449 is operative to perform predetermined coding techniques to arrange video information into displayable formats, in accordance with well-known methods and techniques. Internal arrangements of MPEG Decoder/Multi-Media Processor 449 are well known, and may include analog-to-digital converters, one or more storage media and/or buffers, and general or special-purpose processors or application-specific integrated circuits, along with demultiplexers for demultiplexing and/or synchronizing at least two transport streams (for example, video and audio).

An electronic program guide (EPG) 455 is also provided in set top terminal 400. The EPG 455 is an interactive, on-screen display feature that displays information analogous to TV listings found in local newspapers or other print media. An EPG provides information about each program being broadcast within the time period covered by the EPG, which typically ranges from the next hour up to several days. The information contained in an EPG includes programming characteristics such as, for example, channel number, program title, start time, end time, elapsed time, time remaining, a brief description of the program's content and possibly the names of individuals associated with the program such as the actors, writers and director. The EPG, which is generally received along with the programming content, may be updated on a periodic basis so that the consumer can make appropriate selection for upcoming programs. For example, the electronic program guide 455 may display programs in a tabular format by channel and time so that the user can make selections of desired content. In some cases, instead of transmitting it along with the programming, the electronic program guide 455 may be downloaded via a telephone line, cable connection, satellite up-link, down-link, or radio broadcast antenna.

An on-screen display unit 450 is provided in set top terminal 400. The on-screen display unit 450 is used to display information such as control menus and the like as well as information received from the service provider or MSO that needs to be directly presented to the user regardless of the particular programming or channel that the user is currently viewing. In particular, on-screen display unit 450 displays the information provided by the EPG 455. Accordingly, on-screen display unit 450 can forward the information directly to the display unit 470, where it may appear as an overlay, pop up, or scrolling text ticker that is superimposed on the current programming being viewed. Alternatively, the information from the on-screen display unit 450 may even replace the current programming that appears on the display unit 470.

DVR subsystem 460 is provided for recording programs received from the content delivery system. DVR subsystem 460 can control the channel tuned by tuner 402 and record programming on a manual or timer control basis. Additionally, the DVR subsystem 460 can buffer incoming programs to enable a view to pause or replay a portion of a live program.

Set top terminal 400 further includes a computer-readable storage medium 406. Computer-readable storage medium 406 may be any local or remote device capable of recording or storing data, and in particular may be, or may include, a read only memory ("ROM"), flash memory, random access memory, a hard disk drive, all types of compact disks and digital videodisks, and/or magnetic tape. Various application programs may reside on storage medium 406. The applications residing on storage medium 406 may be computer programs that include software components implemented according to well-known software engineering practices for component-based software development and stored in computer-readable memories, such as storage medium 406. The applications, however, may be any signal processing methods and/or stored instructions, in one or more parts, that electronically control functions set forth herein. Storage medium 406 may also include other programs to provide additional functionality. For example, a network interface program 408 may be provided that represents aspects of the functional arrangement of various computer programs that pertain to the receipt and processing of content and other data over a broadband system.

The various components of set top terminal 400 discussed above may all operate under the overall control of a processor 465. Moreover, it is contemplated that the processor 465, tuner 402, video decoder 449, user interface 404, onscreen display unit 450 and the other components shown in FIG. 4 may each be implemented in hardware, software or a combination thereof. In addition, although the various components are shown as separate processors, it is contemplated that they may be combined and implemented as separate processes on one or more processors.

When the DVR application 306 records a program a number of different files are generated. In particular, as shown in FIG. 5 a content file 510 is generated, which may be stored on a storage medium associated with DVR subsystem 460. The content file 510 stores the various elementary streams (e.g., video, audio, data) that are included with the single program transport stream. In addition, an index file 530 is generated.

The index file 530 stores in a record 540 the program specific information associated with the elementary streams such as MPEG system tables. Such information includes the program's service number, which is used to access MPEG system tables such as the program map table (PMT). As previously mentioned, the PMT describes the elementary streams (e.g., video, audio and data streams) that compose the program being recorded. The PMT specifies the packet identifiers (PIDs) for each elementary stream. For instance, a video program will generally include a video and audio PID as well as certain other PIDs such as a PCR PID and an ECM PID.

The index file 530 is created when a DVR recording is made. The index values stored in the index file 530 are generated while recording the program. These values are received by the DVR application software and stored in the index file. The index file 530 also includes timing information that allows trick play operations (e.g., fast-forward, rewind) to be performed during playback. The index file 530 is also used to derive program timing information, which allows the user to know how far into the program he/she has proceeded.

The index file 530 also includes another record 550 in which timing and synchronization data is located, which is generated by the DVR subsystem 460 as the program is being recorded. The timing data, which in the simplest case may be a running count of the recorded frames or some other time-based program number, is used during playback and so-called trick play modes of operation such as fast-forward and rewind.

When a force tune occurs while an SDV program is being recorded, the EPG application 302 will normally cause the DRV application 306 to abort the recording process since a change in the tuning parameters indicates that the desired program is no longer being recorded. As previously noted, if the subscriber initiates a new recording session after the force tune has occurred with a conventional DVR arrangement, a new content file and a new index file are opened. The new index file will contain the new service number, PIDS and timing data for the new MPEG single program transport stream that contains the remainder of the program. That is, in general, the service number and PIDS for the program transport stream before the force tune will be different from the service number and PIDS for the program transport stream after the force tune. In addition, the timing data generated for the new transport stream that is stored in the new index file after the force tune occurs will be reset so that it begins at the time of the force tune.

In the arrangement described herein, the presence of a force tune is not communicated from the SDV application 304 to the EPG application 302. That is, the SDV application 304 suppresses the normal communications that would inform the EPG application 302 that a force tune has occurred. Since the EPG application 302 is not aware of the force tune, the EPG application 302 will not direct the DVR application 306 to close either the content file 510 in which the program (i.e., the elementary streams) is being recorded or its associated index file 530.

Additionally, when the force tune occurs the DVR application 306 is notified and pauses the current recording. However, the currently open content file 510 and index file 530 remain open so that when recording proceeds after the force tune, the program elementary streams will continue to be stored in the open content file 510 and the associated program specific information such as the timing and other indexing data will continue to be stored in the open index file 530. That is, only a single common content file and a single common index file are used before and after the force tune occurs.

In addition to pausing the recording, the DVR application 306 also creates a new force tune index record 560, which in FIG. 5 is shown as being located within the open index file 530. Of course, more generally, the force tune index record 560, as well as the other tables and records discussed herein, may be formatted and stored in any appropriate manner and in any appropriate location. The DVR application 306 populates the force tune index record 560 with various information that is used to ensure a seamless playback of the recorded program in any operating mode (e.g., normal play, fast forward, rewind) through the transition or demarcation point at which the force tune occurred.

The information provided in the force tune index record 560 may include information obtained from the index file 530 itself prior to the occurrence of the force tune. Such information may include, for instance, the service number and the video, audio and PCR PIDS of the program transport stream prior to the force tune. Since these values will generally change after the force tune is performed, it is necessary to save them so that they will be available when rendering the portion of the recorded program prior to the force tune. In other words, a record is maintained of the program specific information associated with the portion of the program transport stream that was stored prior to receipt of the force tune request. Table 1 summarizes some of the aforementioned program specific information that in some cases may be included in the force tune index record 560.

TABLE 1

| Item | Data Name | Data Description |
|---|---|---|
| 1 | Pre-Force Tune Video PID | This video PID needs to be saved for use when we REW through the Force tune transition. A check needs to be done to determine if the Pre-Force Tune Video PID is different than the Post-Force Tune Video PID. Only if it is different should the HW be set up accordingly. |
| 2 | Post-Force Tune Video PID | This video PID needs to be saved for use when we perform normal playback and FF through the Force tune transition. A check needs to be done to determine if the Pre-Force Tune Video PID is different than the Post-Force Tune Video PID. Only if it is different should the HW be set up accordingly. |
| 3 | Pre-Force Tune Audio PID | The audio PID prior to the force tune needs to be saved for use when we REW through the Force tune transition. A check needs to be done to determine if the Pre-Force Tune Audio PID is different than the Post-Force Tune Audio PID. Only if it is different should the HW be set up accordingly. |
| 4 | Post-Force Tune Audio PID | This Audio PID needs to be saved for use when we perform normal playback and FF through the Force tune transition. A check needs to be done to determine if the Pre-Force Tune Audio PID is different than the Post-Force Tune Audio PID. Only if it is different should the HW be set up accordingly. |
| 5 | Pre-Force Tune | The PCR PID prior to the force tune needs to be saved for use when |

TABLE 1-continued

| Item | Data Name | Data Description |
|---|---|---|
| | PCR PID | we REW through the Force tune transition.. A check needs to be done to determine if the Pre-Force Tune PCR PID is different than the Post-Force Tune PCR PID. Only if it is different should the HW be set up accordingly. |
| 6 | Post-Force Tune PCR PID | This PCR PID needs to be saved for use when we perform normal playback and FF through the Force tune transition. A check needs to be done to determine if the Pre-Force Tune PCR PID is different than the Post-Force Tune PCR PID. Only if it is different should the HW be set up accordingly. |
| 7 | Pre-Force Tune Data PID | The Data PID prior to the force tune needs to be saved for use when we REW through the Force tune transition.. A check needs to be done to determine if the Pre-Force Data PID is different than the Post-Force Tune Data PID. Only if it is different should the HW be set up accordingly. |
| 8 | Post-Force Tune Data PID | This Data PID needs to be saved for use when we perform normal playback and FF through the Force tune transition. A check needs to be done to determine if the Pre-Force Tune Data PID is different than the Post-Force Tune Data PID. Only if it is different should the HW be set up accordingly. |
| 9 | Pre-Force Tune ECM PID | The ECM PID prior to the force tune needs to be saved for use when we REW through the Force tune transition. A check needs to be done to determine if the Pre-Force ECM PID is different than the Post-Force Tune ECM PID. Only if it is different should the HW be set up accordingly. |
| 10 | Post-Force Tune ECM PID | This ECM PID needs to be saved for use when we perform normal playback and FF through the Force tune transition. A check needs to be done to determine if the Pre-Force Tune ECM PID is different than the Post-Force Tune ECM PID. Only if it is different should the HW be set up accordingly. |
| 11 | Last Index File Offset - Pre Force Tune | The index file offset is saved prior to the force tune being executed. This is essentially the program count in time based on video centric data. If the video HW is programmed across the Force Tune transition then this value needs to be added to the HW generated index count to continue to increment count in time. |
| 12 | Pre-Force Tune MPEG Service Number | The MPEG Service number of the program prior to the Force tune transition needs to be saved. This is needed when we perform REW operations across the Force Tune transition. The platform software uses this to carry out necessary Service Information processing. |
| 13 | Post-Force Tune MPEG Service Number | The MPEG Service number of the program prior to the Force tune transition needs to be saved. This is needed when we perform normal playback operations and FF operations across the Force Tune transition. The platform software uses this to carry out necessary Service Information processing. |

In addition to the service number and the PIDS, the information stored in the force tune index record 560 may also include a timing offset that indicates when in the program the force tune occurred. Since the timing number that will be generated and stored in the open index file will be reset to zero after the force tune, the DVR application 306 can add the offset to each value as the timing number increments after the force tune. The timing offset may be simply equal to the last value of the timing number that was generated prior to the force tune. For example, if the force tune occurs at a timing number of 15, the value of the timing offset could be simply 15. In this way, when the timing number resets to zero after the force tune, the initial timing number that will be stored in the open index file will be equal to 0+15, the second timing number will be equal to 1+15, and so on.

After the SDV application 304 has performed the force tune and the DVR application 306 has generated and populated the force tune index file 530, the DVR application 306 continues to record the program in the open content file 510 by removing the pause function. Likewise, the new service number and the new PIDs are stored in the open index file 530 and, in some cases, the force tune index record 560. The timing data continues to be recorded in the timing and synchronization data record 550 by adding the timing offset stored in the force tune index record 560 to the new timing number currently being generated.

When the recorded SDV program is subsequently rendered by the subscriber or other users, the DVR application 306 loads the pre-force tune service number and PIDs into the DVR processing hardware (e.g., the decoders and decryptors located in DVR subsystem 460). This pre-force tune information may be obtained from the force tune index record 560. When the DVR application 306 reaches the transition point in the program (as identified, for example, by the value of the timing offset stored in the force tune index record 560) the DVR application 306 compares the post-force tune service number and PIDs with the pre-force tune service number and PIDs. If the value of any of these parameters has changed, the DVR hardware will be reprogrammed with their post-force tune values so that the program may continue to be rendered.

In some cases the playback of the program will be automatically paused when the force tune transition point is reached in both recording and playback modes. In addition, the audio may be automatically muted so that the user is not subject to any noise such as pops and the like. After the DVR application 306 determines that the portion of the program after the force tune transition point is ready to be rendered, the pause and mute actions can be terminated.

Additional details concerning playback of the program will be discussed in connection with the flowchart shown in FIG. 6, which illustrates one example of the playback process. The method begins in step 605 when a user initiates playback of an SDV program that includes an SDV force tune transition. The DVR application renders the program in step 610 until the transition point is reached, which occurs at the time indicated in the force tune index record. At this time the method proceeds to step 615, during which the playback is paused, the video image is frozen on the display and the audio is muted in order to ensure that no pops are heard. The DVR application also prevents the EPG application from receiving notification of the force tune transition in step 620. Next, in step 625, the DVR application processes the force tune index record by first comparing the pre-force tune PIDs to the post-force tune PIDs to determine if there are any differences. If they differ, then in step 630 the decoders, filters, decryptors, and any other appropriate hardware are reprogrammed with the post-SDV PID information. After the hardware has been reprogrammed, or if no reprogramming is necessary, the process proceeds to step 635, during which the SDV platform software (e.g., the execution engine shown in FIG. 3) flushes the pre-force tune Program Map Table (PMT) from memory. The pre-force tune PMT is the PMT associated with the service that supplied the SDV program prior to the force tune. The platform software also acquires the new PMT for the service that supplied the SDV program after the force tune so that it can commence Service Information processing for the post-force tune service. In this case the platform software uses the MPEG Service Number to parse the proper Service Information messages. The platform software also suppresses any action with regard to sensing MPEG Version changes in the PMT, which are normally performed when detecting a new version of the PMT. That is, when the platform software detects a new PMT, it normally causes the PIDs that are different to be reprogrammed. However, in this case the new PIDs (i.e., the post-force tune PIDs) have already been programmed into the hardware in step 630 and thus the MPEG Version control processing of the PMT can be suppressed.

As indicated in step 640, the platform software also flushes all the closed caption and/or subtitle data once the force tune transition point is reached. After the hardware is programmed with the post force tune PIDs and the playback session has been resumed, closed caption and/or subtitle data can continue to be processed in the normal manner. In this way it can be ensured that the closed caption and/or subtitle data can be properly presented on both sides of the force tune transition. The process next proceeds to step 645, during which the SDV program continues to be rendered past the SDV force tune transition point. That is, the video image is unfrozen and muting of the audio is removed so that the playback session can continue. While the user may experience some disruption, the disruption should be minimal.

If during playback the user rewinds back through the force tune transition, the platform software programs the pre-force tune PIDs from the force tune index record into the hardware. In addition, during rewind the PMT and the closed captions and/or subtitle data is processed in the same manner as described above when the force tune transition point is reached during normal playback.

The processes described above, including but not limited to those presented in connection with the headend and set top terminal may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described for recording and rendering an SDV program through a force tune transition without the need to close the content or index files that were created before the occurrence of the force tune. In this way no user or $3^{rd}$ party interaction is required to continue playback of the program across the point where the force tune interrupted the recording.

The invention claimed is:

1. A method of recording a switched digital video (SDV) program received over a content delivery system, comprising:
    receiving a single program digital transport stream on a first SDV channel associated with a first frequency, wherein the single program digital transport stream includes at least one program elementary stream and associated program specific information;
    storing the program elementary stream and the associated program specific information;
    in response to a SDV force tune request requesting tuning to a second SDV channel different from the first SDV channel, the second SDV channel associated with a second frequency different than the first frequency, tuning to the second SDV channel on which a subsequent portion of the single program digital transport stream will be provided; and
    after tuning to the second SDV channel, storing subsequent portions of the program elementary stream in a content file in which previous portions of the program elementary stream are stored.

2. The method of claim 1 wherein the single program digital transport stream is an MPEG transport stream and the associated program specific information includes at least one packet identifier (PID) identifying the at least one program elementary stream.

3. The method of claim 2 wherein the associated program specific information further includes a PCR PID, an ECM PID and a service number.

4. The method of claim 1 further comprising:
    generating timing information as the single program digital transport stream is being received and stored;
    in response to the SDV force tune request, defining a timing offset to denote a point in time at which SDV the force tune occurred; and
    after tuning to the second SDV channel, storing timing information for the subsequent portions of the program elementary stream by adding the timing offset to the generated timing information.

5. The method of claim 1 further comprising, after receipt of the SDV force tune request, maintaining a record of the program specific information associated with a portion of the program elementary stream that was stored prior to receipt of the SDV force tune request.

6. The method of claim 1 further comprising pausing storage of the program elementary stream while tuning from the first SDV channel to the second SDV channel.

7. The method of claim 1 further comprising preventing an EPG module from receiving notification of receipt of the SDV force tune request when an SDV program is being recorded.

8. At least one computer-readable storage medium encoded with instructions which, when executed by a processor, performs a method including:

receiving user input requesting playback of a program recorded from a switched digital video (SDV) channel available from a content delivery system;

causing a first set of program specific information associated with a first portion of the recorded program to be loaded into a DVR processor;

causing the first portion of the recorded program to be retrieved from a content file and rendered using the first set of program specific information;

upon reaching a transition point in the rendered program at which an SDV force tune request was received, the SDV force tune request requesting tuning to a second SDV channel different from the SDV channel and associated with a frequency different than a frequency associated with the SDV channel during recording, comparing the first set of program specific information to a second set of program specific information associated with a second portion of the recorded program received after completion of the force tune request and causing values of the second set of program specific information to be loaded into the DVR processor if they differ from their corresponding values in the first set of program specific information; and causing the second portion of the recorded program to be retrieved from the content file and rendered using values of the program specific information presently loaded in the DVR processor.

9. The computer-readable storage medium of claim 8 further comprising causing the rendering of the first portion of the recorded program to be paused upon reaching the transition point until the second portion of the recorded program is ready to be rendered.

10. The computer-readable storage medium of claim 8 further comprising causing timing information to be loaded into the DVR processor when rendering the second portion of the recorded, wherein the timing information includes a timing offset to denote a point in time at which the SDV force tune occurred.

11. The computer-readable storage medium of claim 8 further comprising preventing an EPG module from receiving notification of the transition point in the rendered program.

12. The computer-readable storage medium of claim 8 further comprising flushing a Program Map Table (PMT) from memory upon reaching the transition point in the rendered program.

13. The computer-readable storage medium of claim 8 further comprising:

receiving user input requesting rewind of the program playback of the program through the transition point; and upon reaching the transition point while rewinding the program, causing the values of the first set of program specific information to be loaded into the DVR processor if they differ from their corresponding values in the second set of program specific information.

14. A set top terminal comprising:

a receiver/tuner for receiving switched digital video (SDV) programs over a content delivery system;

an SDV module for coordinating SDV sessions in cooperation with an SDV manager associated with the content delivery system;

a DVR module for coordinating storage and playback of SDV programs received over the content delivery system, wherein the DVR module is configured to store in a common control file and common index file a program elementary stream and associated program specific information, respectively, extracted from both a first portion of an SDV program received on a first SDV channel associated with a first frequency and a second portion of the SDV program received on a second SDV channel associated with a second frequency different than the first frequency in response to a SDV force tune request received by the SDV module; and a processor operationally associated with the receiver/tuner, the SDV module and the DVR module.

15. The set top terminal of claim 14 further comprising an EPG module for formatting EPG data received over the content delivery system, wherein the DVR module is configured to prevent the EPG module from receiving notification of receipt of a SDV force tune request when an SDV program is being recorded.

16. The set top terminal of claim 14 wherein the DVR module is further configured to generate timing information as the program elementary stream is being received and stored and to define and store a timing offset to denote a point in time at which the SDV force tune request occurs.

17. The set top terminal of claim 16 wherein the DVR module is further configured to store timing information for the second portion of the SDV program by adding the timing offset to timing information that is generated while the second portion of the SDV program is being received and stored.

18. The set top terminal of claim 14 wherein the DVR module is further configured to store, after receipt of the force tune request, a record of the program specific information associated with the first portion of the program elementary stream that was stored prior to receipt of the SDV force tune request.

19. The set top terminal of claim 14 wherein the DVR module is further configured to pause storage of the program elementary stream while tuning from the first SDV channel to the second SDV channel.

20. The set top terminal of claim 14 wherein the DVR module is further configured to flush a Program Map Table (PMT) from memory upon reaching a SDV force tune transition point when rendering an SDV program.

* * * * *